May 24, 1927.

W. S. ANDREWS 1,629,984

RAILWAY MOWER

Filed Feb. 1, 1926

Walter S. Andrews, Inventor

By Lancaster and Allwine
Attorneys

May 24, 1927.
W. S. ANDREWS
1,629,984
RAILWAY MOWER
Filed Feb. 1, 1926
3 Sheets-Sheet 3
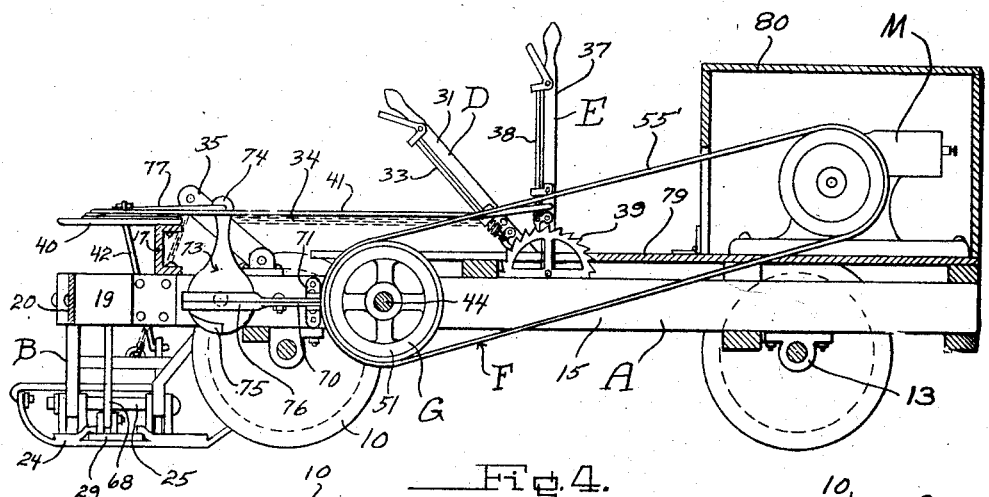
Fig. 3.
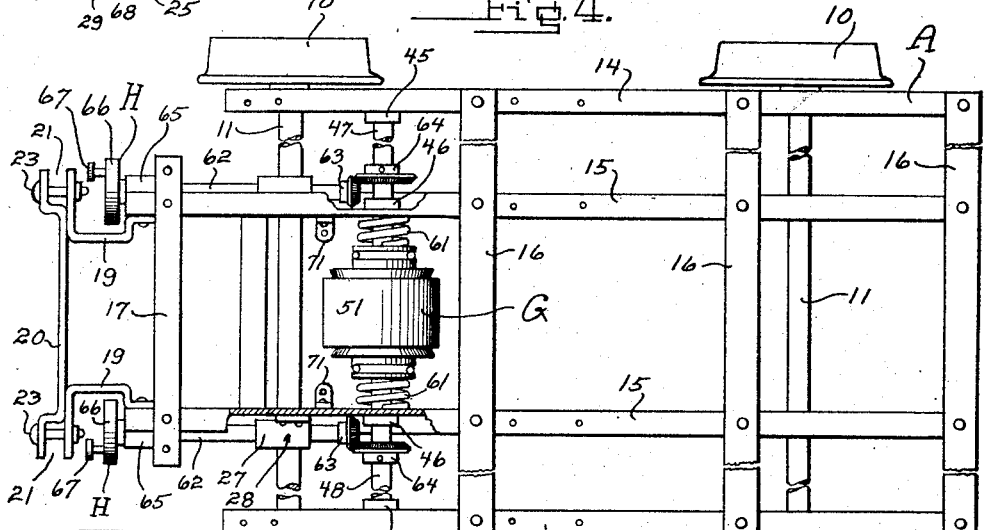
Fig. 4.
Fig. 5.
Walter S. Andrews, Inventor Patented May 24, 1927.

1,629,984

UNITED STATES PATENT OFFICE.

WALTER S. ANDREWS, OF EUSTIS, NEBRASKA, ASSIGNOR OF ONE-HALF TO CHARLIE N. JOHNSTON, OF CURTIS, NEBRASKA, AND ONE-FOURTH TO CARL W. JOHNSTON, OF TAFT, CALIFORNIA.

RAILWAY MOWER.

Application filed February 1, 1926. Serial No. 85,285.

The present invention relates to mowing machines, and more particularly to a device of this character for use in cutting the vegetation along railway right of ways.

The primary object of the invention is to provide an improved railway mower adapted for mowing weeds, grass, or other vegetation along railways to each side of the tracks in an efficient manner, regardless as to whether the surface to the sides of the track extends in a horizontal plane or take the form of embankments sloping either upwardly or downwardly from the sides of the track.

A further object of the invention is to provide an improved railway mower which is devoid of complicated mechanism disposed laterally of the mower car, and wherein the cutting mechanism is supported inwardly of the track wheels of the car clear of obstructions in the track, such as dirt, cinders and other machine damaging materials.

A still further object of the invention is to provide an improved railway mower having mower units extending laterally to each side of the mower car, with control means for each mower unit whereby the units may be independently raised and lowered vertically and may independently be disposed in either upwardly or downwardly inclined positions with respect to the railway tracks.

A still further object of the invention resides in the provision of a pair of reciprocating mower units pivotally mounted upon the mower car, with means for automatically causing either of the mower units to cease functioning when that mower unit has been raised above a cutting angle, or prior to reaching such an angle.

A still further object of the invention is to provide a device of this character which embodies but comparatively few parts susceptible of being readily damaged due to rough usage, and one wherein the actuating means for the mower units are of such construction and so arranged as to decrease vibration, and thus eliminate damage to other machine parts of the device.

A still further object of the invention is to provide a railway mower preferably intended to be towed by any tractive power desired, thus permitting of the prime mover carried by the mower, to produce sufficient power to cut any and all kinds of heavy vegetation at a good rate of speed.

A still further embodiment of the invention resides in the bracket supporting means for the mower units, whereby the mower units are held rigidly at right angles to the mower car to each side of the tracks.

Other objects and advantages of the invention will be apparent during the course of the following detail description, taken in connection with the accompanying drawings, forming a part of this specification and in which drawings—

Figure 3 is a central longitudinal section through the mower and showing the mower unit in a lowered position.

Figure 4 is a top plan view of the mower chassis and showing the position of a portion of the transmission means for the mower units.

Figure 5 is a central longitudinal section through the clutch mechanism for independent operation of the mower units.

Figure 6 is an enlarged fragmentary sectional view showing the manner of pivotally connecting the angular brace rod of the mower rigging to the chassis of the car.

Figure 7 is a fragmentary sectional view showing the manner of adjustably connecting the clutch control means with the lift means for the mower units.

Figure 1:
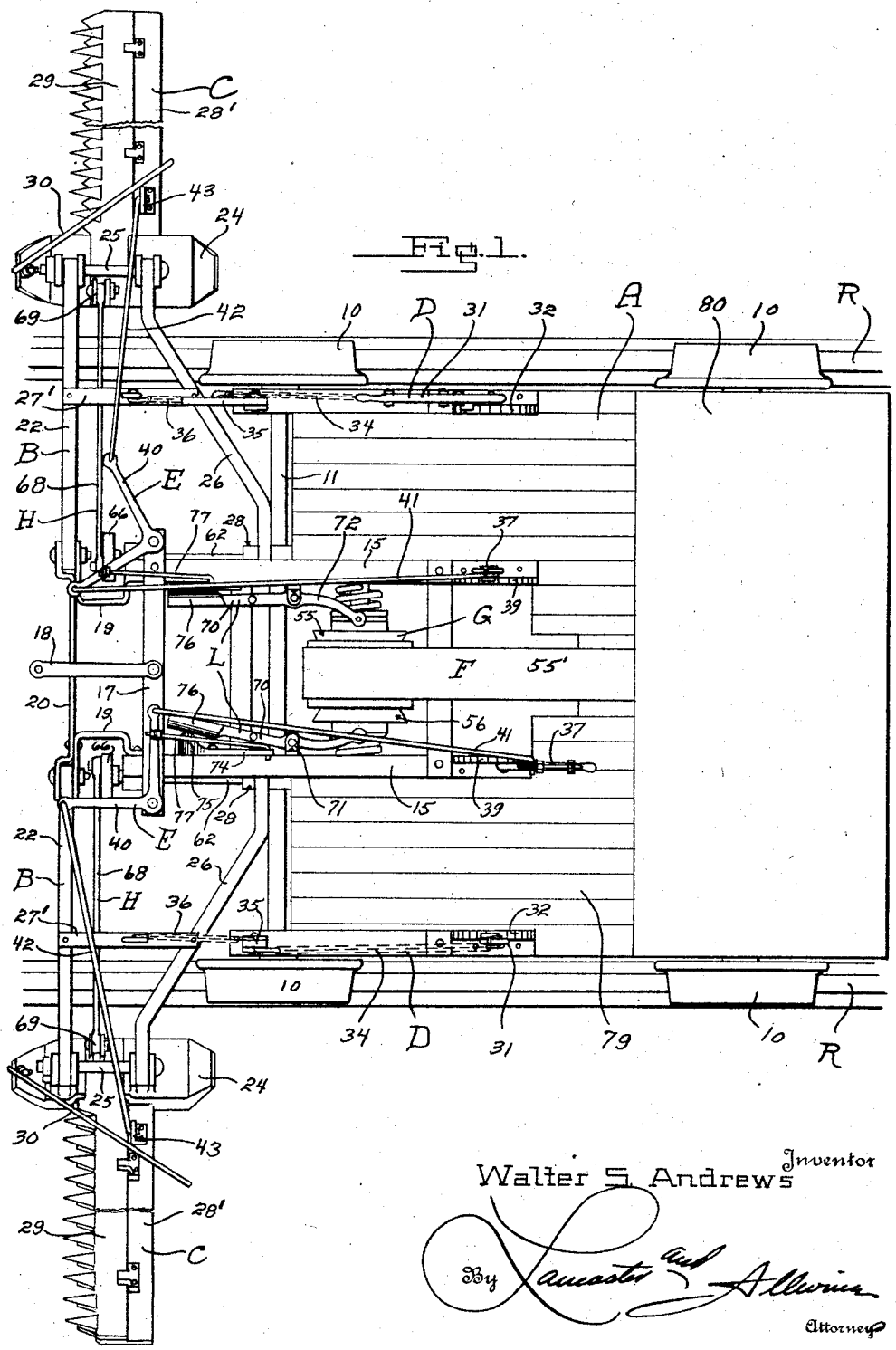
Figure 1 is a top plan view of the improved railway mower, showing the mower unit to the right of the path of travel of the track car in a lowered operative position, and the mower unit to the left of the path of travel of the track car in a raised inoperative position.

Referring to the drawings in detail, and wherein similar reference characters designate corresponding parts throughout the several views, letter A designates generally a track car of special construction for running upon the rails R. B designates mower riggings pivotally supported at one end upon the car A; C mower units pivotally carried by the outer end of each rigging B; D elevating means for vertical raising and lowering of the rigging B; and E lift means for vertical swinging of the mower units C about their pivotal connections with their respective riggings B. The letter F designates generally a transmission means, embodying a clutch mechanism G; independent mower actuating means H; and clutch control means L for each mower unit for automatic releasing of the respective mower actuating means H upon upward swinging of the mower units above a predetermined angle. The letter M may designate a power delivering means of any description for the transmission means F.

The running gear of the track car A preferably consists of flanged wheels 10 for travel upon the rails R, and which wheels may be connected by the axles 11 upon which the chassis designated as a whole by the numeral 12, may be mounted as by suitable axle boxes 13.

The chassis 12 embodies longitudinally extending supporting beams 14 upon which the axle boxes 13 may be mounted, and longitudinally extending mower supporting beams 15 arranged in spaced relation inwardly of the track wheels 10 and supporting beams 14. These mower supporting beams 15 which are arranged above the axle 11, project forwardly of the car past the front wheels and axle as clearly illustrated in Figure 4. The beams 14 and 15 which may be of channel shape in cross section, may be held in proper spaced relation by a series of transverse stay members 16 suitably arranged above and below the beams. A hitch beam 17 is connected across the forward ends of the beams 15, at the upper side of the beams, and to which a suitable draft hitch 18 may be connected to be hooked to a suitable draft means forming tractive power for the mower car. Connected inwardly of each supporting beam 15, and extending forwardly therefrom in substantially U-shaped formation, are shield plates 19 connected at their forward ends by a transverse tie plate 20 having its ends offset forwardly of the shield plates for providing pockets 21 forwardly of the front ends of the beams.

The mower riggings B, which are adapted for rigidly supporting the mower units C to each side of the track car, embody laterally extending brace rods 22 pivotally mounted at their inner ends within the pockets 21 as by suitable pivot bolts 23 extending in parallel relation with the mower supporting beams 15 for permitting of vertical swinging of the brace rods. The outer end of each brace rod 22 is pivotally mounted in suitable supports provided on the shoe 24 of the mower units C, as by means of suitable pivot bolts 25 extending in a horizontal plane parallel with the longitudinal center of the car. Pivotally connected at their outer ends to the pivot bolts 25, and extending rearwardly of the brace rods 22, are angular brace rods 26 which extend inwardly in diverging relation with the rods 22 and have their inner ends pivotally mounted upon the forwardly extending sleeve portions 27 of bearing brackets 28 secured to the outer side of each arm 15 at points spaced rearwardly from the forward ends of the beams. The rods 22 and 26 are connected intermediate their ends by means of a brace rod 27'. As will be observed in Figures 1 and 4, the pivot pins 23 for pivotal mounting of the inner ends of the straight rods 22, extend in axial alignment with the sleeve portion 27 of the bearing blocks 28, in order that the mower riggings may readily swing in a vertical plane about their pivotal connections with the car.

The mower units C which may be of the standard reciprocating type, embody in addition to the shoes 24 to which the outer ends of the mower riggings are pivotally connected, guide bars 28' for reciprocal mounting of the sickle bars 29. The shoes 24 are preferably cast in one piece for preventing liability of vegetation from clogging on the sickle bar head, and which construction also allows for the sickle bar to operate close to the track during the mowing operation. Suitable bars 30 may be attached to the forward end of each shoe and extend rearwardly over the sickle bar for guiding the vegetation being cut to the sickle bar.

The elevating means D for vertical raising and lowering of the riggings B, and which are adapted to be operated independently of one another, embody hand levers 31 pivotally mounted one upon each of the supporting beams 14, and sectors 32 into engagement with which suitable latch means 33 carried by the levers may engage for locking the levers in their adjusted positions. Connected one to each of the levers 31 and extending forwardly therefrom, are chains or cables 34 having their forward ends anchored in stand levers 35 pivotally mounted at their lower ends upon the respective supporting beams 14 and adapted for swinging movement forwardly and rearwardly of the car. Connected also, one to each of the stand levers 35, are flexible chains or cables 36 which extend forwardly of the levers and have their forward ends anchored in the brace rods 27' of the mower riggings B. Thus it will be seen that by forward and rearward swinging of the levers 31, that the respectively connected mower riggings B will be lowered and raised about their pivotal connections with the track car and which movement of the mower riggings will lower and raise the mower units C to various elevations beside the car.

Referring now to the lift means E for vertical swinging of the mower units C about their pivotal connections with their respective riggings B, each embody lift levers 37 pivotally mounted for swinging movement forwardly and rearwardly upon the mower supporting beams 15, and each of which levers carry latch means 38 for engaging in sectors 39 for retaining the lever against forward swinging. Pivotally mounted adjacent the terminal ends of the hitch beam 17, one for each of the levers 37, are bell crank levers 40 pivotally connected at their elbows to the hitch beam, and to the end of one arm of each a pull rod 41 is connected, and the opposite end of said rod, which extends rearwardly from the bell crank, is anchored in its respective operating lever 37. Connected at one end to the opposite arm of each bell crank 40, are laterally extending lift rods 42 having their outer ends pivotally mounted in the upper ends of stand arms 43 rigidly attached at their lower ends to the guide bars 28 at points spaced slightly from the shoe 24. Thus it will be seen that upon forward or rearward swinging of one of the levers 37, that its respective mower unit, through action of the rod 41, bell crank 40 and rod 42, will be swung in a vertical plane about its pivotal connection with its rigging. Such an arrangement permits of the mower units being disposed at various angles in a vertical plane, in accordance with the contour of the road bed adjacent to the tracks.

Referring now to the transmission means F, the same embodies in part a divided power shaft 44 mounted transversely of the car at a point rearwardly of the bearing blocks 28 in suitable end or thrust bearings 45 mounted on the supporting beams 14, and bearings 46 carried by the supporting beams 15. The power shaft 44 being divided midway, provides right and left power shaft sections 47 and 48 respectively, arranged in axial relation with one another and having their abutting ends 49 arranged at a point midway between the mower supporting beams 15. This construction is for permitting of free relative movement of one shaft section with respect to the other.

Mounted for free rotation upon the power shaft 44 and having its hub portion 50 overlying the abutting ends of the shaft sections 47 and 48, is a drive wheel 51 having oppositely disposed conical shaped recesses 52 and 53 for forming clutch pockets at each side of the drive wheel. This drive wheel, in the example shown, has been provided with a smooth peripheral face 54 about which a belt 55' may be trained for imparting rotary movement to the drive wheel from the power delivering means M, which in the example shown has been illustrated as being a prime mover mounted upon the rear of the track car.

It is preferred that the track car be attached to a suitable tractor means and receive its propelling power from an external source, in order that the full power developed by the prime mover M may be imparted to the mower units in order that the same may cut any and all kinds of heavy vegetation at a good rate of speed.

Clutch members 55 and 56 feathered respectively upon the power shaft sections 47 and 48, at opposite sides of the drive wheel 51, as by means of keys 57, are adapted for movement into and out of frictional engagement with the drive wheel and for transmitting rotary motion to their respective shaft sections upon movement into frictional engagement with the drive wheel. Each of the clutch members 55 and 56, which are adapted for sliding movement longitudinally along their respective shaft sections, embody heads of conical shaped formation, which are adapted for fitting into the respective recesses 52 and 53 with the inclined peripheral faces 58 thereof serving as clutch faces for frictionally engaging the inclined wall of the recesses, and clutch collars 59 provided with annular grooves 60. Coiled about each of the power shaft sections 47 and 48, are expansion coil springs 61 having one end bearing against the clutch collar 59 and its opposite end bearing against the inner face of one of the mower supporting beams 15. These springs 61, which may be termed clutch springs, act for normally forcing their respective clutch members into clutching relation with the drive wheel 51.

Referring now to the mower actuating means H for independent operation of the mower units, the actuating means for each mower unit embodies a drive shaft 62 extending longitudinally of the mower supporting beam 15 and journalled near its rear end in one of the bearing blocks 28 which as before stated also serves as a pivotal connection for the inner end of the angular brace rods 26. Fixedly carried by the rear end of each drive shaft 62, are bevel gears 63 which are adapted to mesh with bevel gears 64 carried one upon each of the power shaft sections 47 and 48. Each of the drive shafts 62 are journaled near their forward ends in suitable bearings 65 mounted upon the beams 15, and have mounted upon their forward ends forwardly of the beams 15, pitman wheels 66 provided with eccentrically arranged pins 67. These pitman wheels 66, as illustrated in Figure 4, are shielded by means of the forwardly projecting shield plates 19. A pitman 68 preferably formed of wood, is pivotally mounted at one end upon each of the pins 67, and has its opposite end pivotally connected as at 69 to the inner end of its respective sickle bar 29 for imparting a reciprocatory motion to the sickle bar for performing the cutting operation.

The clutch control means L for independently operating either of the mower units C, embodies a clutch lever 70 pivotally connected intermediate its ends to one of the mower supporting beams 15 as by a suitable bracket 71 disposed forwardly of the power shaft 44. The clutch levers 70 are provided at their rear ends with yokes 72 which are adapted to engage in the annular recesses 60 of their respective clutch members in a manner so that when the clutch levers are swung about their pivotal points, their respective clutch members may be moved out of clutching relation with the drive wheel 51. Rotatably mounted upon horizontal pivots, and disposed forwardly of the brackets 71, are clutch trips 73 each embodying an upwardly extending arm 74 and provided at their lower portions and upon their confronting faces with cam portions 75 extending in an arcuate direction concentric with the pivot point of the trips. These cam portions 75, when the arm 74 is swung rearwardly, are adapted to engage arcuate portions 76 provided at the forward ends of the clutch levers 70, thus swinging the forward end of the lever inwardly about its pivot point, and forcing its respective clutch member outwardly against the tension of its spring 61 out of clutching relation with the drive wheel 51. Connected to the upper end of the arm 74 of each clutch trip 73, is a forwardly extending link 77 having its forward end adjustably mounted in a swivel block 78 connected to that arm of the bell crank lever 40 to which the pull rod 41 is attached. Thus it will be seen that the link 77 is caused to move forwardly and rearwardly in unison with its respective pull rod 41.

A suitable platform 79 may be supported upon the upper transverse beams 16, and a housing 80 arranged at the rear of the car for enclosing the prime mover M may serve as a seat for the operators of the mower while operating the control levers 31 and 37.

Figure 2:
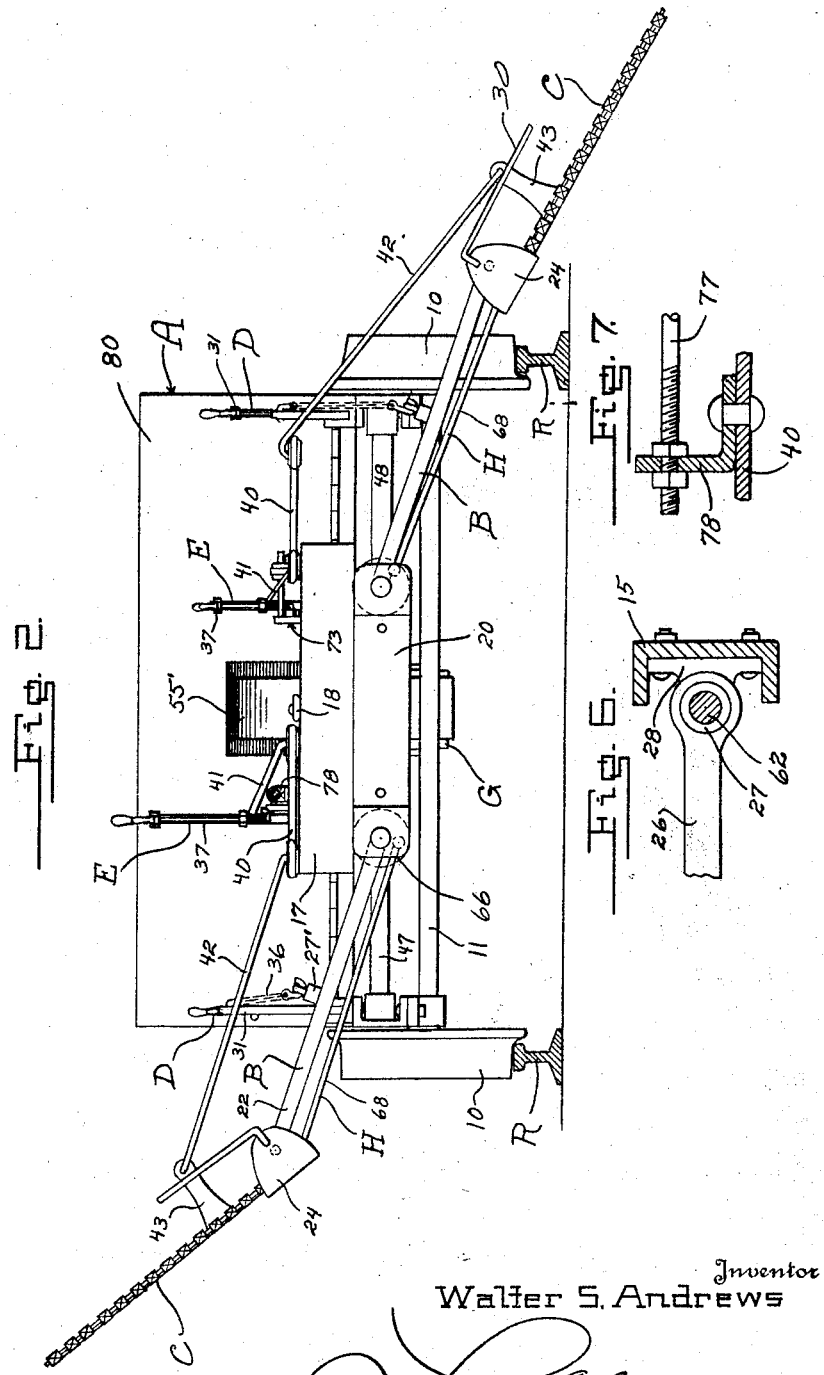
Figure 2 is a front plan view of the mower and showing the oppositely disposed mower units in reverse positions from that illustrated in Figure 1.

Referring once more to the clutch control means L, and which is automatic in its operation, such has been provided for independently cutting out either of the mower units C when the units have been swung upwardly past a cutting angle, or to a position approaching a vertical or at a right angle to its pitman 68. As will be readily observed in Figure 2, were the mower unit, which is shown in an upwardly inclined position, to be further swung upwardly about its pivotal connection with its rigging, a binding action would occur between the sickle bar 29 and the pitman 68 since the mower unit would then extend at an angle substantially at right angles to the path of travel of the reciprocating pitman. By so connecting the bell crank 40, to which the pull rods 41 are connected, with the clutch shift for the respective mower units, by means of the links 77, it will be seen that when the levers 37 are swung rearwardly their respective clutches will be disengaged through the medium of the lever 70 and cam portion 75. By so mounting the cutting mechanism inwardly of the track wheels of the car, torsional strain upon the car will be greatly reduced when the mower units are operating. It will also be seen that by so spacing the inner ends of the brace rods 22 and 26 that the mower units will be rigidly held in position at the sides of the car.

It will of course be apparent that the type of track mower herein illustrated is intended for use in cutting vegetation to both sides of a single track, and if used upon a double track, merely one mower unit will be used, the opposite unit being raised to an inoperative position.

In operation, the attendant standing upon the platform 79 may first throw the lever 31 forwardly for lowering the respective mower units to a desired elevation beside the rail R. The respective lever 37 may then be moved forwardly for disposing the respective mower units at the desired angle in accordance with the contour of the land beside the rail, and which forward movement of the lever 37, through the medium of the rod 41, bell crank 40, link 77, clutch trip 73, and clutch lever 70, allows the respective clutch member 55 to be moved into frictional engagement with the drive wheel 51 by means of the expansion spring 61, and which clutch movement through means of the mower operating means H will impart a reciprocatory motion to the sickle bar 29. Should during forward travel of the tractor, the mower unit be raised to an angle for cutting the vegetation on an embankment sloping upwardly from the rail, which angle of the mower unit would be liable to cause a binding action upon its pitman 68, the clutch control means L through the medium of the link 77, will automatically disengage the clutch and thus prevent further reciprocatory movement of the sickle bar until the mower unit is again lowered to a cutting angle. Thus it will be seen that upon forward movement of one of the levers 37, its respective mower unit will be lowered and its sickle bar automatically started reciprocating, and upon rearward swinging of the lever for raising the mower unit, motion transmitting means to the sickle bar will be broken for rendering the units inoperative whenever raised above a predetermined angle to the side of the track car.

From the foregoing description it will be apparent that a railway mower has been provided embodying novel features for supporting of the cutter mechanism so as to prevent liability of damage thereto during operation of the mower, and embodying features whereby the mower units which are adapted for independent operation at each side of the car, may be so positioned for cutting vegetation either upon horizontal surfaces at the sides of the rails or upon embankments sloping either upwardly or downwardly from the sides of the track, said mower units being so supported upon the car that when raising of either mower unit past a predetermined angle, the same is automatically rendered inoperative for preventing liability of damage to the operating mechanism of the units.

Various changes may be made to the specific form of the invention herein shown and described, as well as adaptation of the device for cutting along highways, without departing from the spirit of the invention or the scope of the following claims.

I claim:

1. In a railway mower, a track car embodying longitudinally extending supporting beams arranged in parallel spaced relation at the longitudinal center of the car and at a substantial distance inwardly of the track wheels of the car, mower riggings pivotally supported at their inner ends upon the beams and extending laterally to each side of the car forwardly of the front wheels of the car, and a mower unit pivotally connected to the outer end of each mower rigging.

2. In a railway mower, a track car, mower units pivotally supported upon the car and extending laterally to each side of the car, means for independently raising and lowering of the mower units, a clutch mechanism embodying a drive wheel and clutch members arranged at each side thereof for movement into and out of clutching relation with said wheel, actuating means connected with each clutch member for independent actuation of the mower units, intermediately pivoted clutch levers for independent actuation of said clutch members, and rotatable clutch trips for each clutch lever for actuating the respective clutch members of the mower units upon vertical swinging of the mower units.

3. In a railway mower, a track car embodying longitudinally extending mower supporting beams, mower riggings pivotally connected at their inner ends each upon a supporting beam and extending laterally past the track wheels of the car, mower units embodying reciprocating sickle bars, pivotally connected at the outer end of each rigging, lift means for each mower unit, drive shafts mounted longitudinally of the supporting beams and having pitman wheels carried by their forward ends, pitmans connecting each pitman wheel with the sickle bar of their respective mower units, drive shaft sections operatively connected with each pitman drive shaft, a drive wheel, clutch members feathered upon each drive shaft section for clutching relation with said drive wheel, means for imparting rotary movement to said drive wheel, and means embodying clutch trips connected with each lift means and acting upon each clutch member for disengaging the same from the drive wheel and rendering their respective mower units inoperative upon upward swinging past a predetermined angle.

4. A railway mower comprising a track car embodying longitudinally extending mower supporting beams arranged inwardly of the track wheels, mower riggings pivotally supported at one end upon said beams and extending laterally past the track wheels, elevating means for independent raising and lowering of the mower riggings, mower units pivotally connected to the outer end of each rigging and embodying reciprocating sickle bars, means for independent raising and lowering of the sickle bars, embodying bell crank levers pivotally mounted at the forward end of each mower supporting beam, actuating means for each sickle bar, embodying independently operable clutch members, independent clutch levers for independent actuation of the clutch members, and independent clutch trips for each clutch lever and connected with the respective bell crank levers whereby the independent clutch members will be automatically moved into and out of clutching relation with a drive member upon respective lowering and raising of the mower units about their pivotal connection with their respective riggings.

5. In a railway mower, a track car, mower riggings pivotally supported on the car and extending laterally to each side of the car, mower units embodying reciprocating sickle bars, pivotally supported upon the outer end of each rigging, lift means for independent raising and lowering of the mower units, means for independently imparting movement to the sickle bars, and means for independently rendering each mower unit inoperative upon upward swinging past a predetermined angle and operative when lowered to a cutting position, including pivoted clutch levers and rotatable clutch trips operatively connected with the lift means and having cam portions for actuation of their respective clutch levers upon actuation of the lift means.

WALTER S. ANDREWS.